(12) United States Patent
Basilier (10) Patent No.: US 7,061,880 B2
(45) Date of Patent: Jun. 13, 2006

(54) SYSTEMS AND METHODS FOR MULTICAST COMMUNICATIONS

(75) Inventor: Henrik Basilier, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 900 days.

(21) Appl. No.: 09/975,760

(22) Filed: Oct. 11, 2001

(65) Prior Publication Data

US 2003/0073453 A1 Apr. 17, 2003

(51) Int. Cl.
 *H04H 1/00* (2006.01)
(52) U.S. Cl. .................. 370/312; 370/329; 370/341; 370/349; 370/390
(58) Field of Classification Search .............. 370/310, 370/312, 329, 341, 347, 348, 349, 352, 390, 370/437, 395.52
 See application file for complete search history.

(56) References Cited

U.S. PATENT DOCUMENTS

| | | | | | |
|---|---|---|---|---|---|
| 5,917,819 | A | * | 6/1999 | Yang et al. | 370/390 |
| 6,046,979 | A | * | 4/2000 | Bauman | 370/229 |
| 6,078,964 | A | * | 6/2000 | Ratcliff et al. | 719/310 |
| 6,262,979 | B1 | * | 7/2001 | Anderson et al. | 370/267 |
| 6,490,622 | B1 | * | 12/2002 | Nagami et al. | 709/225 |
| 6,741,575 | B1 | * | 5/2004 | Zhang et al. | 370/329 |
| 6,847,633 | B1 | * | 1/2005 | Ryu et al. | 370/352 |
| 6,850,495 | B1 | * | 2/2005 | Baum et al. | 370/256 |
| 6,862,622 | B1 | * | 3/2005 | Jorgensen | 709/226 |
| 2001/0048662 | A1 | * | 12/2001 | Suzuki et al. | 370/230 |
| 2002/0026525 | A1 | * | 2/2002 | Armitage | 709/238 |
| 2002/0194589 | A1 | * | 12/2002 | Cristofalo et al. | 725/32 |
| 2003/0012217 | A1 | * | 1/2003 | Andersson et al. | 370/437 |

FOREIGN PATENT DOCUMENTS

| | | |
|---|---|---|
| EP | 1071296 | 1/2001 |
| EP | 1077539 | 2/2001 |
| WO | WO 00/57601 | 9/2000 |

OTHER PUBLICATIONS

Ooms, D et al: "IP Multicast in MPLS Networks" Proceedings of the IEEE Conference 2000 on High Performance Switching and Routing. Heidelberg, Germany, Jun., 26-29, 2000, Proceedings of the IEEE Conference on High Performance Switching and Routing, New York, NY: IEEE, US, Jun. 26, 2000, pp. 301-305, XP001075715 ISBN: 0-7803-5884-8.
Draft—CDMA2000 Broadcast Services Stage 2; Higher Layer Design QUALCOMM, Inc., Oct. 15-19, 2001.
cdma2000 Broadcast Services Stage 2: System Design QUALCOMM, Inc., Aug. 20, 2001.

* cited by examiner

*Primary Examiner*—Dang Ton
*Assistant Examiner*—Shick Hom
(74) *Attorney, Agent, or Firm*—Coats & Bennett, P.L.L.C.

(57) ABSTRACT

Systems and methods are provided to establish multicast capabilities for communication systems including wireless communication and internet protocol (IP). An exemplary communication system may include one or more content servers (CSs), IP network, packet data serving nodes (PDSNs), IP radio-to-packet network (IP (RP)), base stations (BSs), and mobile stations (MSs) all communicatively coupled together. The content servers may provide a communication multicast on the same IP multicast address. The PDSN to MS communications may use, for example, protocols IGMP (IPv4) and/or MLD (IPv6) for control signaling of the IP multicasting. These protocols may be augmented by MCFTP. The signaling may include identifiers including the IP multicast address, a flow code that may be generated by the PDSN, a unique mapping reference identifier, and various radio parameters. Various signal flow approaches are presented for establishing and maintaining multicast communication between a content server and a mobile station.

29 Claims, 7 Drawing Sheets

SYSTEMS AND METHODS FOR MULTICAST COMMUNICATIONS

FIELD OF THE INVENTION

The present invention is generally directed to communication systems and methods, and more specifically to systems and methods for providing multicasting.

BACKGROUND OF THE INVENTION

In the past, wireless communications were comprised primarily of voice services using analog communication technology, e.g., cellular telephones for voice communications. This technology is often referred to as first generation technology. In the past few years there has been a great deal of development and implementation of digital wireless technology that has included digital technology and other applications such as data communications, e.g., wireless web use on digital cellular telephones and personal digital assistants (PDAs). This technology is often referred to as second generation technology. At the same time, use of the internet has expanded rapidly and has been developed using a communication protocol commonly referred to as internet protocol (IP). IP is comprised of packets with a header and payload. The header may include various information for signal routing and management. The payload may include, for example, voice, data, video, and/or multimedia information. Most recent developments in wireless communications have began to incorporate and integrate IP and create numerous data and voice applications and functionality not previously possible. These developments presently underway are often referred to as third generation technology. The third generation wireless communication devices and infrastructure will likely use internet protocol for at least data communications and provide multicast and broadcast applications and functionality.

In general, IP multicast is an inter-network service that allows IP datagrams sent from a source to be delivered to more than one interested receiver. An IP multicast flow is in general similar to an ordinary IP flow (IP datagrams sent from a source to a destination) except the destination address is an IP multicast address. The flow can be identified by source address, destination address, destination port (identifier for one of a plurality of applications on an IP device (e.g. a server)), etc. For example, a given source (device and/or application) sends packets to the network with a destination address, e.g., a multicast address, and the network transports these packets (replicated where necessary) to all the receivers that have requested receipt or registered for the information packets being transmitted by the source. One application of a multicast service is sending real time stock pricing from Wall Street servers in New York City across the internet to one or more wireless personal digital assistants (PDAs) in Washington, D.C.

SUMMARY OF THE INVENTION

Accordingly, the present invention is directed to systems and methods for providing multicast capabilities for communication systems. In an exemplary embodiment using for example CDMA-2000, the communication systems and methods may include wireless communications and internet protocol (IP). The communication system may include one or more content servers (CSs) coupled to an IP network. The content servers may provide a communication multicast on the same IP multicast address. The IP network may be coupled to one or more packet data serving nodes (PDSNs) that may receive IP multicast routing protocols and IP multicast packets from the IP network. The one or more PDSNs may be coupled to a radio-to-packet network (RP network) that may include IP. One or more base stations (BSs) that may include packet control functions (PCFs) may be coupled to the RP network. One or more mobile stations (MSs) may be coupled to the BS/PCF using, for example, interim standard 2000 (IS-2000). The PDSN to MS communications may use, for example, protocols IGMP (IPv4) and/or MLD (IPv6) for control signaling of the IP multicasting. These protocols may be augmented by Multichannel Flow Treatment Protocol (MCFTP).

Signaling between the various system components may include various identifiers to help correctly establish, coordinate and map multicast information flow from one or more CSs to one or more MSs based on a MS request. These identifiers may include a CS address, an IP multicast address, a flow code for identifying the multicast flow from a CS to a PDSN, a unique mapping reference identifier to identify a particular multicast flow being provided by the PSDN through the BS/PCF to various MSs, and various radio parameters indicating to the various MSs the radio broadcasting resource or channel upon which a multicast flow is being transmitted.

In one embodiment, a PDSN may generate a Flow_Code and MCS_Ref per multicast information flow based on a request by one or more MSs to join a multicast from a particular CS. The Flow_Code may be globally unique to identify a particular multicast from a particular content server. The MCS_Ref may be locally unique to a group of PSDNs and may be mapped to a particular Flow_Code via, for example, a binding procedure. The PDSN may receive filters from the MS using, for example MCFTP, that may be used to provide packet classification for mapping the multicast information flows to an MCS_Ref. The PDSN may provide the Flow_Code and MCS_Ref binding to the BS/PCF where it may be stored and send the required MCS_Ref through the BS/PCF to the MS that meets the requested multicast information flow. The BS/PCF may generate and allocate Radio_Params mapped to the MCS_Ref, which are needed by an MS to tune into the multicast session in the case of a radio broadcast flow treatment of the multicast information. The BS/PCF may send the MCS_Ref-Radio_Params mapping to the MS. The MS uses this mapping information to tune into the requested multicasting session being broadcast by the BS/PCF.

In operation, a mobile station may establish multicast communication that includes information from one or more of the content servers. The mobile station may tune into more than one multicast at a time. In various embodiments the MCFTP protocol may be used by the MS to inform the system whether a shared broadcast service or a dedicated ordinary communication channel should be used to transmit the multicast information. In the case when a radio broadcast is used, numerous MSs can receive the multicast information simultaneously. However, if a BS/PCF does not have a distinct radio broadcast channel or the MS is not capable of receiving information on the distinct radio broadcast channel, an ordinary BS to MS transmission channel may be used. The network may play a role in determining whether the channel established is a broadcast channel or a dedicated channel. For example, the network may turn an existing multicast flow provided on a dedicated channel to a flow provided on a broadcast channel, i.e., a dedicated channel into a broadcast channel. Further, the network may provide the multicast flow on a broadcast channel even though a MS requests a dedicated channel, and the network may instruct the MS to use the broadcast channel. Efficiency may play a role in determining network assignment of a broadcast channel or dedicated channel for the multicast flow. If, for example, only one MS has requested a flow, the network might dictate a dedicated channel so that the system uses the power control feature found with a dedicated channel. If more then one MSs are requesting to become members of a multicast flow through one BS/PCF, then the network may use a threshold to determine whether or not to use one broadcast channel or multiple dedicated channels. Further, as previously indicated, various embodiments may have signaling for establishing a multicast session that may include a number of identifiers, such as the CS address, IP multicast address, a unique flow identifier that identifies a multicast flow to identify information flowing from the same multicast through different PDSNs (Flow_Code), a multicast identifier unique to a particular multicast service (MCS_Ref), and a radio parameter identifier (Radio_Params) that may include radio parameters used for setting a MS to receive a particular multicast. Using these various identifiers the system provides a scalable approach to establishing numerous multicast service instances with multicast information flowing from one or more content servers to one or more mobile stations. Various exemplary signaling embodiments are provided herein to indicate how multicasting service may occur according to the present invention.

In one embodiment the mobile station may instruct the system that it wishes to listen to a particular multicast from a particular content server on an ordinary communication channel. In this case the signaling may include, for example, an Internet Group Management Protocol (IGMP) status report and a MCFTP pattern update. In another embodiment, the mobile station may instruct the system that it wishes to listen to a particular multicast from a particular content server on a broadcast channel without having been a previous subscriber to the multicast. In this case the signaling may include, for example, an IGMP status report, a MCFTP pattern update, and a bind statement including Flow_Code and MCS_Ref identifiers. In even another embodiment, a mobile station instructs the system that it wishes to listen to a particular multicast from a particular content server and a particular PDSN over a broadcast channel, where the multicast has already been subscribed to by another MS. In this case, the signaling may include, for example, an IGMP status report, an MCFTP pattern update including a Broadcast channel request, and an MCFTP message that includes a map flow to an MCS_Ref. In still another embodiment, a mobile station instructs the system that it wishes to couple to a particular PDSN and continue to listen to a particular multicast from a particular content server on a broadcast channel, though another MS has already been a subscriber to the same multicast from the same content server through a different PDSN. In this case the signaling may include, for example, an IGMP status report, an MCFTP pattern update including a Broadcast flow treatment request, a bind statement including Flow_Code and MCS_Ref2 identifiers, a bind exist statement including MCS_Ref1, and an MCFTP message that includes a map flow to an MCS_Ref1. In yet another embodiment, the MS moves from one BS/PCF cell to another BS/PCF cells, and the system coordinates the continuation of an existing multicast flow with the MS. In this cases, the signaling may include, for example, a new packet zone identifier (PZID), a new RP link message, an unbind statement including Flow_Code and MCS_Ref identifiers, and a bind statement including Flow_Code and MCS_Ref identifiers.

BRIEF DESCRIPTION OF THE DRAWINGS

The objects, features and advantages of the present invention will become more readily apparent to those skilled in the art upon reading the following detailed description, in conjunction with the appended drawings, in which.

DESCRIPTION OF THE PREFERRED EMBODIMENTS

Multicast services may play a significant role on the Internet as the Internet continues to increase in scale by providing various services to users that might not otherwise be efficient. Ideally, an IP multicast-enabled network provides end-to-end services in the IP network infrastructure to allow any IP host to send datagrams to an IP multicast address that any number of other IP hosts or receiving devices widely dispersed can receive. The receiving devices may be a wireless device, for example, a mobile station such as a mobile phone, palm pilot, web pad, etc. However, providing end-to-end multicast services on the internet using IP integrated with wireless communications creates various challenges because of the limited bandwidth of present wireless communication connections. The present invention is directed to a new approach to establishing, coordinating and managing an end-to-end multicast service for communication systems.

There are generally two kinds of multicast service approaches available today. The Any Source Multicast (ASM) and the Source Specific Multicast (SSM). The ASM approach allows a receiving device to simply join the group by in part knowing the correct group address (e.g., a multicast group address) without the need to know the identity or address of the source device(s). On the other hand, the SSM approach requires the receiving device to know both the group identity or address and the identity or address of the relevant source device(s). The invention, or portions thereof, is applicable to both ASM and SSM.

The signaling between various system devices is carried out using a number of protocols to enable an IP multicast service. Typically at least two protocols are needed. First, an IP host-based protocol may be provided to allow a receiver device to notify a local router(s) that it wishes to join a particular multicast service group and request the initiation of the data flow from all sender(s) within the scope of the multicast service group. Exemplary protocols include Internet Engineering Task Force (IETF) based host-to-router protocols, such as internet group management protocol (IGMP) used with Internet protocol version 4 (IPv4), and multicast listener discovery protocol (MLD) used with Internet protocol version 6 (IPv6). Second, an IP router-based protocol may be provided to allow a multicast source to send multicast datagrams to one or more multicast group addresses and any routers with multicast group members (e.g., receiving devices) on their local networks to communicate with other routers to ensure that all datagrams sent to the multicast group address are forwarded to all receivers within the intended scope of the multicast service group. An example of such a routing protocol is multicast open shortest path first (MOSPF) which may be an open shortest path first (OSPF) that is modified to include multicast extensions. Further, the multichannel flow treatment protocol (MCFTP) defined by TSG-P (subgroup within the Third Generation Partnership Project 2, 3GPP2) may be used for the purpose of identifying IP flows and defining their treatment.

The 3GPP2 document 3GPP2 P.S0001-B, Version 1.0.0, dated Sep. 17, 2001, and entitled "Wireless IP Network Standard," includes an Annex F that provides details on MCFTP. This document is incorporated herein by reference in its entirety. While the 3GPP2 document should be referred to for detailed inquiry, MCFTP in general supports the signaling of 3GPP2 packet filters, header stripping/generation and header removal information in the packet data network. Additionally, MCFTP might be used to signal channel treatment for an auxiliary service instance on which no PPP (Point-to-Point Protocol) control signaling may be carried. Further, channel treatment such as PPP compression or encryption might be indicated via MCFTP.

Given the existing multicast approaches and protocols, the amount of information needed to be communicated over the air interface to/from a MS to establish and manage a multicast service link session may be substantial relative to the narrow bandwidth of present wireless communication devices, particularly relative to the MCFTP and when using SSM approach.

Figure 1:
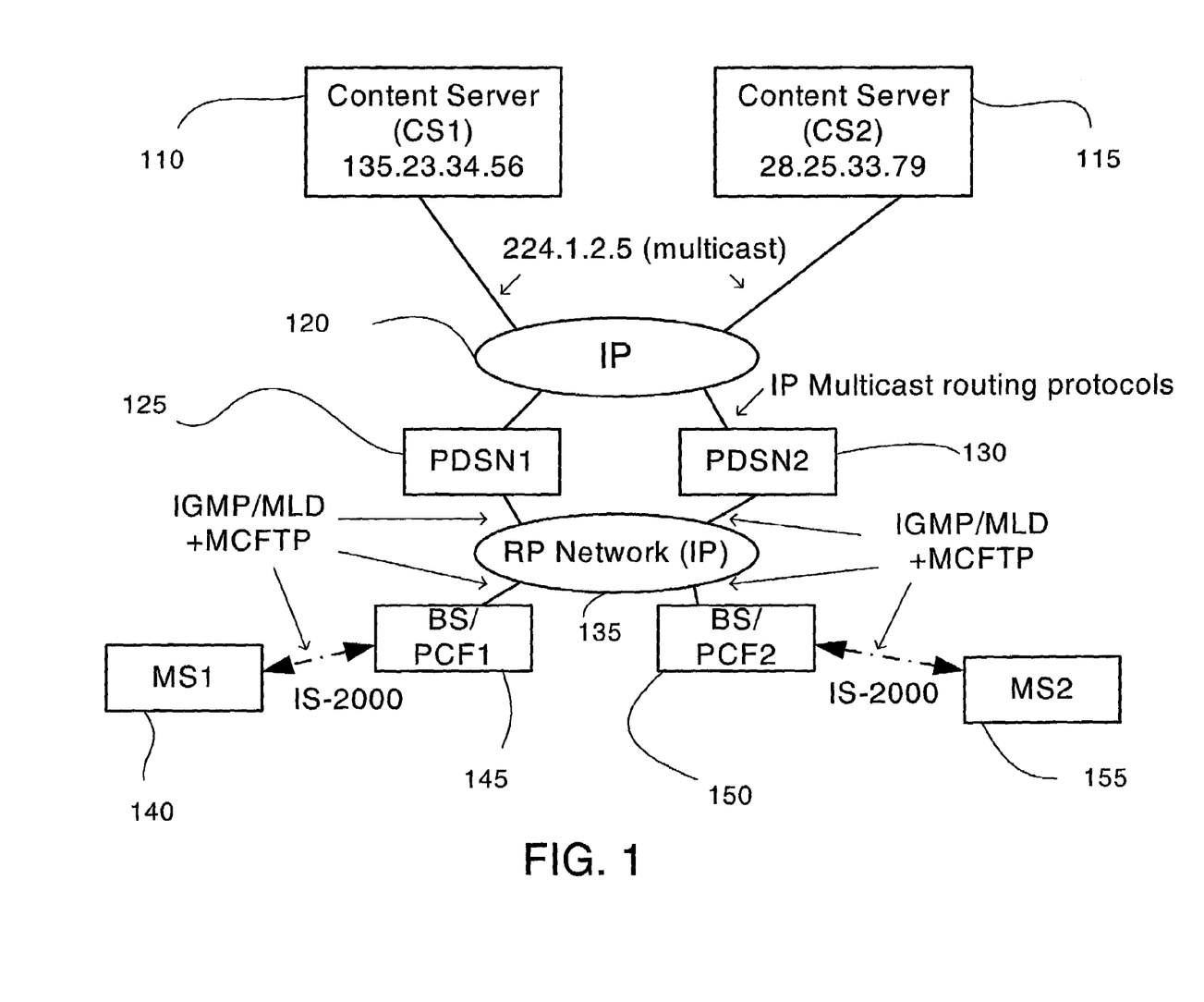
FIG. 1 depicts an exemplary communication system including IP multicast services.

Referring now to FIG. 1, an exemplary communication system including IP multicast services according to the present invention is provided. As illustrated, the communication system may include one or more content servers (CSs), CS1 110 and CS2 115, coupled to an IP network 120. Each of the content servers may have an assigned address, for example 135.23.34.56 for CS1 110 and 28.25.33.79 for CS2 115. The IP network 120 may be coupled to one or more packet data serving nodes (PDSNs), for example PDSN1 125 and PSDN2 130. The PSDNs may be, for example, routers. The multicast packets may be routed from the CSs to the PDSNs through routers in the IP network 120 supported by, for example, IP multicast routing protocols. These IP multicast routing protocols used between the CSs and PDSN are in one embodiment preferably standard IP multicast routing protocols such as MOSPF, without any other interface. As indicated, the content servers may provide respective communication multicasts that are transmitted to the same IP multicast address, e.g., 224.1.2.5. PDSN1 125 and PDSN2 130 may be coupled to a radio-to-packet network 135 (RP network (IP)) that may include IP. The RP network (IP) 135 may be coupled to one or more base stations that include packet control functions (PCFs), for example, BS/PCF1 145 and BS/PCF2 150. One or more mobile stations (MSs), e.g., MS1 140 and MS2 155, may be coupled to the BS/PCFs using, for example, interim standard 2000 (IS-2000). As indicated in FIG. 1, the PDSN to MS communications may use, for example, protocols IGMP (IPv4) and/or MLD (IPv6) for control signaling of the IP multicasting. These protocols may be augmented by MCFTP. Although the system of FIG. 1 illustrates only two CSs, two PDSNs, two BS/PCFs, and two MSs, the system may be scaled to have any number of these devices. In fact, from a practical perspective, it is likely that the system would have many more MSs coupled to it at any given instant in time.

In operation, the system uses end-to-end IP multicast. IP multicast packets are directly routed to the PDSNs, PCSN1 125 and PDSN2 130, and IP multicast mechanisms are used with the PDSNs being the first hop router seen by the mobile stations, MS1 140 and MS2 155. The MS requests receipt of an IP multicast and the system establishes the routing to send the correct IP multicast datagrams to the MS. In the example provided in FIG. 1 both content servers, CS1 110 and CS2 115, "send" multicast packets to the same IP multicast address (224.1.2.5). As such, there are two different IP multicast flows active in the network which may be designated by the MSs for receipt, multicast flow 135.23.34.56, 224.1.2.5 from CS1 110 and multicast flow 28.25.33.79, 224.1.2.5 from CS2 115. By having more content servers in the network, there would be more multicast flows that are possible through a given multicast address. Although a MS may typically request a single multicast flow at a time, a MS could request simultaneous reception of more than one multicasts or all multicasts sent to a particular multicast address by, for example, simply requesting receipt of the multicast address (e.g., 224.1.2.5). Any valid Ipv4 or Ipv6 multicast addresses may be used by the CSs. The multicast addresses do not have to be previously known by the MS, but they can be. For example, the multicast address may be stored in the MS memory or IP application (e.g., web browser). In one variation, the multicast address may be sent in real time with, for example, an announcement using protocols such as session internet protocol (SIP), real time transport protocol (RTSP), etc.

The RP network (IP) 135 has in this example a 2—2 configuration and as such, any BS/PCF can connect to any PDSN. In other words, a BS/PCF having multiple MSs coupled to it may have some MSs coupled to PDSN1 125 and some MSs coupled to PDSN2 130. Further, a MS can change its serving BS/PCF without changing PDSNs. For example, MS1 140 may first be coupled to PDSN1 125 through the BS/PCF1 145 while traveling in the BS/PCF1 145 cell then be coupled to PDSN1 125 through the BS/PCF2 150 by moving into the BS/PCF2 150 cell. The MS's request to join a multicast group and to receive multicast data transmission may be set up and managed by using control signaling such as IETF protocols IGMP (Ipv4) and/or MLD (Ipv6) along with MCFTP. Although, the MCFTP may include various modifications. Further, the IS-2000 air interface between the BS/PCFs and MSs may be modified to include a radio broadcast capability to efficiently utilize the radio channels available to the BS/PCFs. By introducing a broadcast feature to the MCFTP, more than one MS may listen to the same IP multicast using one transceiver of a respective BS/PCF. The RP network 135 interface may also require some modification as well. For example, the multicast flow may be associated with a broadcast channel rather than a dedicated channel.

Figure 2:
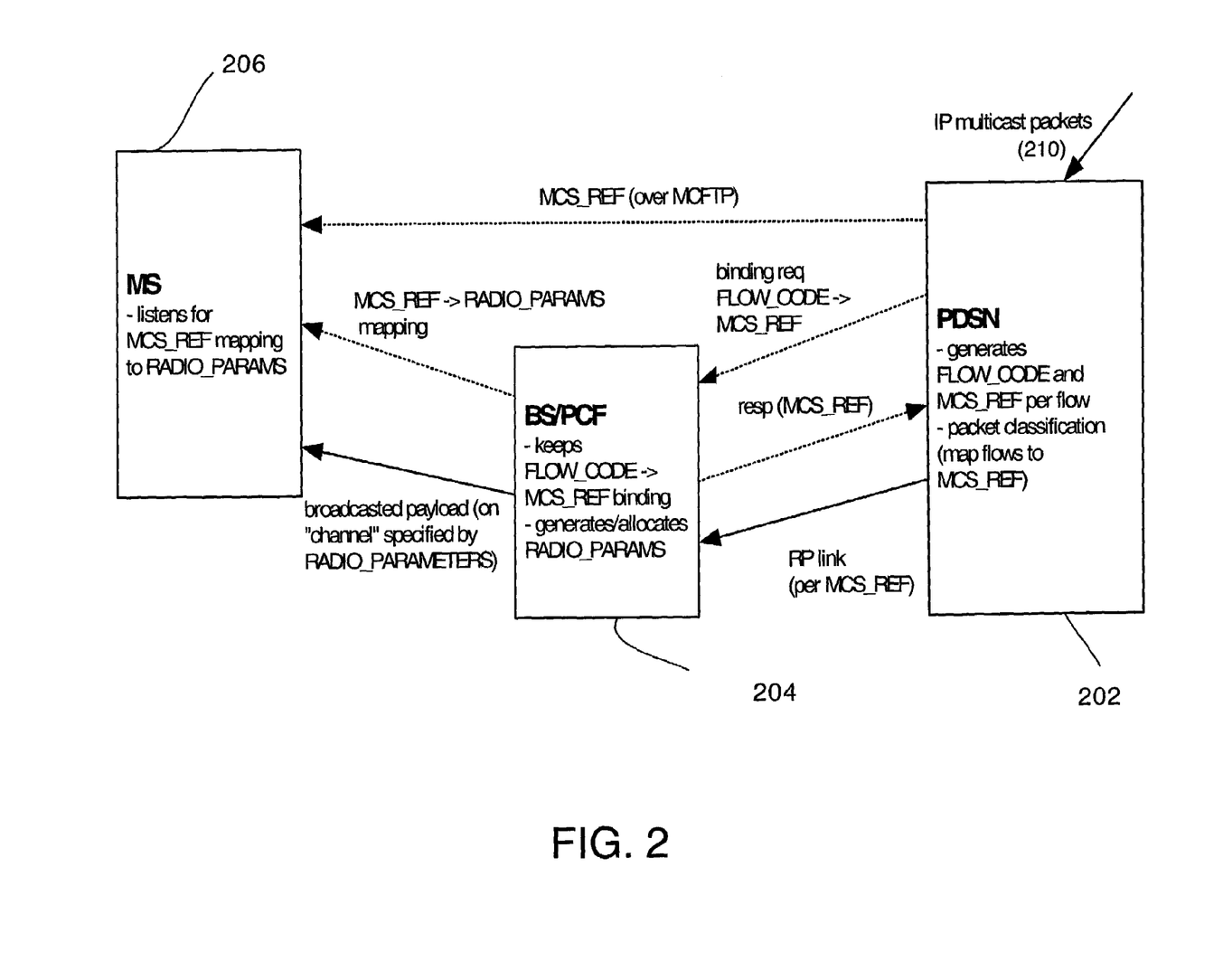
FIG. 2 depicts a general overview of signaling and various unique identifiers used for carrying out multicast communications between the PDSN and MS, according to one embodiment of the present invention.

Referring now to FIG. 2, a general overview is provided of signaling flows and various unique identifiers used for establishing and carrying out multicast communications between the PDSNs and MSs according to one embodiment of the present invention. The identifiers may include, for example, a Flow_Code, MCS_Ref, and Radio_Params. In this embodiment, a PDSN 202 may generate a Flow_Code and MCS_Ref per multicast information flow based on a request by one or more MS 206 to join a multicast from a particular CS (e.g., CS1 110). The Flow_Code may be a globally unique identifier generated from information about an IP multicast flow (e.g. from the components of a filter describing the flow) using, for example, a well defined (e.g., standardized) procedure. For example, the Flow Code may include the source address, destination address, destination port, etc. from the filter which is then encoded with an algorithm to produce a unique multicast flow specific bit string. This string may be sent by the PDSN 202 and matched in the BS/PCF 204 to a mapped bit string. The Flow_Code may be used by a BS/PCF 204 to make sure that two PDSNs do not "send" the same stream of data over the same BS/PCF 204. The Flow_Code would typically be relatively large and consume a fair amount of space. Therefore, it is better that a smaller sized identifier be created to send over the air interface to the MS 206 for identifying the correct multicast flow to provide to the MS 206. To this end, the PDSN 202 generates a unique multicast service reference (MCS_Ref) and associates it with a Flow_Code to identify each multicast flow requested by one or more MSs. The MCS_Ref is thus mapped by the PDSN 202 to a particular multicast flow. The MCS_Ref identifier is uniquely assigned within a group of PDSNs, typically the PDSNs connected to the same set of BS/PCFs. Each PDSN can be assigned a subset of the allowed values for use as the MCS_Ref identifier.

The PDSN 202 may provide the Flow_Code and MCS_Ref to the BS/PCF 204 and the MCS_Ref to the MS 206 in response to the MS 206 request to join a multicast session. The BS/PCF 204 may then store a list of Flow_Codes for which there are bindings created at that specific BS/PCF 204 along with the mapping from Flow_Codes to MCS_Refs. The BS/PCF 204 may then allocate a radio channel for the multicast session and generate a Radio_Params identifier including the radio parameters needed by the MS 206 to tune to the allocated radio channel. The MCS_Ref sent to the MS 206 may then be used by the MS 206 to find the Radio_Params that applies to a specific multicast flow. The multicast flow may be transmitted to the MS over a radio broadcast resource (or channel) or a normal channel designated for a specific MS 206. Some examples of Radio_Params may include the transmission frequencies of the radio broadcast channel, codes used in transmission on the radio broadcast channel, etc. Essentially the radio transmission information necessary for the MS receiver to be able to receive and decode data transmitted on the radio broadcast channel. The smaller sized MCS_Refs (rather than the larger Flow_Codes) are used over the air interface to inform the mobile stations of the mapping of a flow to the necessary Radio_Params. As such, the BS/PCF 204 will also send a set of MCS_Ref→Radio_Params mapping to the MS 206, so that the MS 206 will know where to find a particular IP multicast flow (e.g. which radio channel) with the MCS_Ref received from the PDSN 202. All or a portion of the MCS_Ref→Radio_Params stored by the BS/PCF 204 may be sent to the MSs using, for example, a radio broadcast channel. If the multicast is to be broadcast to the MS 206, the BS/PCF 204 transmits the multicast flow on the channel specified by the Radio_Params and the MS 206 (or any MS coupled to the BS/PCF) would tune to this channel over which the BS/PCF is broadcasting the multicast. In fact, there can be more than one radio broadcast "channel" and the PDSN can map individual IP multicast flows to respective broadcast channels.

After becoming a member of a multicast, the MS 206, because it is by definition mobile, may move from a location served by the BS/PCF it is first receiving the multicast through to a location served by a different BS/PCF. In this case the system needs to notify the MS 206 it has changed BS/PCF and provide the multicast session to the MS 206 through a different BS/PCF. To notify the MS of its movement to a new BS/PCF, the BS/PCF may broadcast to all MSs in its area a packet zone identifier (PZID) that is unique to that respective BS/PCF. Further, the new BS/PCF may from time-to-time broadcast a set of MCS_Ref→Radio_Params mappings or the MS might poll or request the network to send the information to it when needed. The MCS_Ref may remain unchanged at an inter BS/PCF, intra-PDSN hand-off, although the Radio_Params will likely change. Since each BS/PCF coupled to the same PDSN (intra-PDSN) maintains all mappings between Flow_Codes and MCS_Refs related to that PDSN, each intra-PDSN to BS/PCF hand-off can convey the previously assigned MCS_Ref mapped to, for example, a new set of Radio_Params. Further, in the case of inter-PDSN movement a BS/PCF may, in a situation where a flow already exists, convey the previously assigned MCS_Ref to the requesting PDSN even though the particular MCS_Ref it used may have been assigned by a different PDSN. Thus, in either case, a MS 206 that has moved into a new BS/PCF can upon detection of a new PZID also find out from the BS/PCF the new Radio_Params to which a MCS_Ref is mapped and tune to the designated channel to continue the multicast communication. However, if the movement of the MS to a new PZID results in a new PDSN being selected, a new MCS_Ref and MCS_Ref→Radio_Params mapping for the new PDSN has to be established for the multicast flow. In this case there could potentially be a period of time where the MS receives packets that do not correspond to the "subscribed" IP multicast flow. The MS can be configured to filter the erroneous traffic out while awaiting instructions regarding the new MCS_Ref→Radio_Params mapping.

Although not illustrated in FIG. 2, the RP network 135 is included in the multicast flow and provides RP links for the packet traffic. RP links are logical links/connections between the BS/PCF 204 and the PDSN 202 used by the BS/PCF 204 to identify the channel to use when transmitting over the air interface. RP links are bidirectional. In the case of IP multicast the RP link may be in a single direction to the MS downlink. When the PDSN 202 sends data encapsulated in IP packets to the BS/PCF 204 for transmission over the air interface between the BS/PCF 202 and the MS 206, these are sent over "RP links." Different packets may need to go over different channels. RP links may be used to differentiate mobile stations traffic to/from different mobile stations. The A10 (payload traffic) of the RP network 135 interface (user plane) operates in a similar manner for multicast flow as with ordinary packet traffic. For example, generic routing encapsulation (GRE) protocol can be used for encapsulation of packets to be sent from the PDSN 202 to the BS/PCF 204 with its address. For a multicast flow only a single RP link per BS/PCF 204 needs to be used regardless of the number of MSs coupled to the flow sent over it the RP link. MCS_Ref can be used to distinguish or key the RP links.

As illustrated above, the three identifiers, Flow_Code, MC_Ref, and Radio_Params, and other identifiers (e.g., CS address and multicast address) may be combined to provide flexible and efficient multicast communications sessions that may be scaled without causing excessive system traffic, to limit the information or knowledge required by the BS/PCF 204, and resolve handoff situations. Integrated with the use of one or more radio broadcast channel(s) included in the BS/PCFs, the present invention will enable efficient multicast communications that take into consideration the limited bandwidth of the air interface included in the last hop of the system including the PDSNs, BS/PCFs, and MSs. As constructed according to the present invention and as perceived by the mobile station user, the multicast service and system may provide an "always on" type of service similar to TV broadcasting service.

The invention may be better understood by a review of a number of exemplary scenarios illustrating various signal flows for establishing and managing a multicast session flow according to the present invention. These exemplary signal flows follow.

Figure 3:
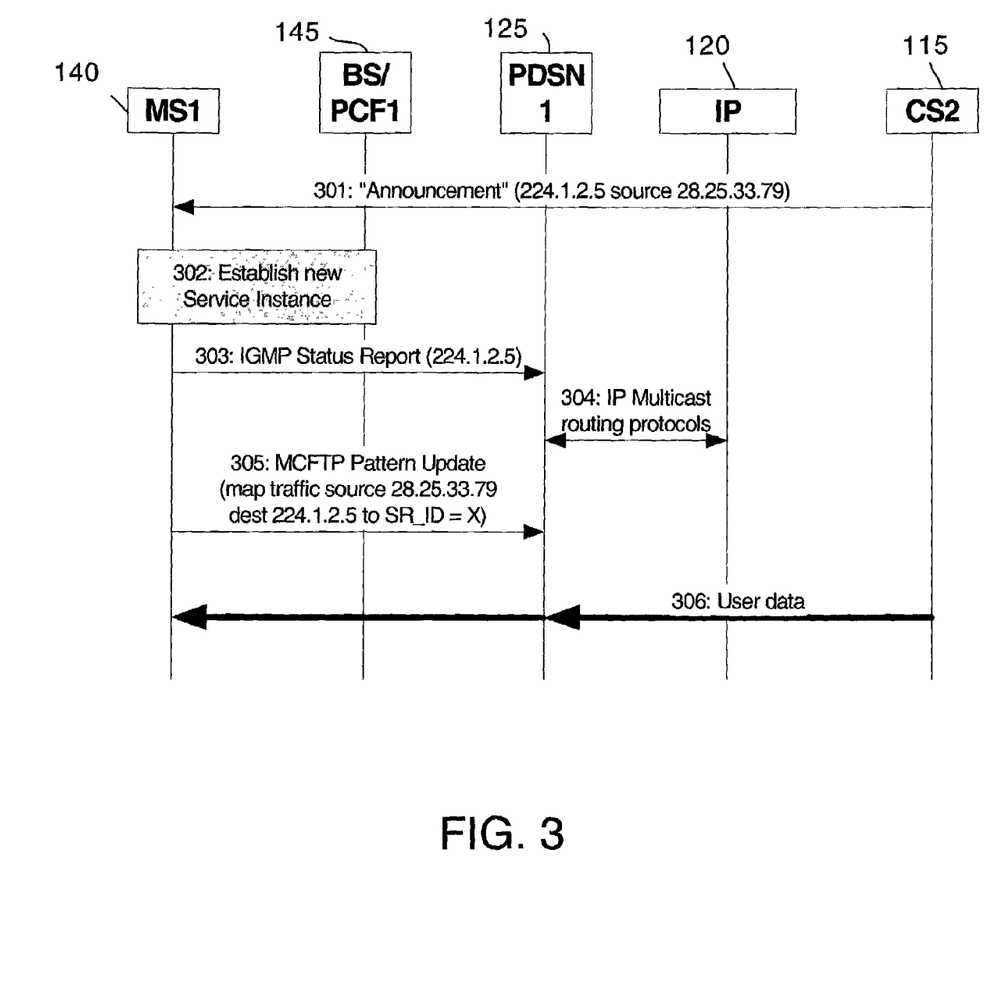
FIG. 3 depicts an exemplary signal flow for an embodiment in which a MS establishes a multicast communication session with a particular content server using an ordinary radio channel.

Referring now to FIG. 3, an exemplary signal flow is illustrated for an embodiment in which MS1 140 establishes a multicast communication session with CS2 115 using a dedicated radio channel. According to the present invention, a MS may request a particular IP multicast flow to be mapped to a dedicated radio channel (i.e., similar to a "normal" service instance) rather than to a broadcast channel. This request could be the result of various system needs, for example, internal limitations in the MS, application specific needs, the current Radio Access Network (RAN) (i.e., the BS/PCF) may not support the broadcast capability, etc. In any case, a multicast communication session may be established between CS2 115 and MS1 140 on a dedicated mobile radio channel using the exemplary signaling steps illustrated in FIG. 3.

First, MS1 140 finds out that an IP Multicast flow is sent from CS2 115 (address 28.25.33.79) to the IP multicast group (address 224.1.2.5), e.g. through some other protocol such as SIP, Hypertext Transfer Protocol (http), etc. For example, a user might activate a hyperlink to connect to a streaming audio session. In this case, in step 301, the MS1 140 is sent an announcement message indicating that a multicast communication session is active. This announcement, Announcement (224.1.2.5, 28.25.33.79), includes the IP multicast address and the content server address for CS2 115. Next, at step 302, the MS1 140 decides to listen to this flow, but does not want to listen to the broadcast capabilities, due to e.g. lack of capability/resources. Thus, MS1 140 and BS/PCF1 145 establish a new service instance for this IP multicast flow. However, in one variation of the invention, a new service instance might not be established if there is an existing broadcast of an IP multicast flow for the same IP multicast that could be used. Then, at step 303, MS1 140 sends an IGMP Status Report (224.1.2.5) message to PDSN1 125 that includes the multicast address to join the multicast group. Next, at step 304, PDSN1 125 will interact with other routers in the IP 120 to become a part of the multicast tree for the IP multicast occurring on address 224.1.2.5 via various IP multicast routing protocols. Then, at step 305, the MS1 140 sends an MCFTP pattern update (map traffic source 28.25.33.79 dest 224.1.2.5 to SR_ID=X) request to PDSN1 125 to create a mapping from the IP multicast flow to the newly created service instance (X). An SR_ID is typically used for normal services (non multicast/broadcast) to differentiate different "channels" that are allocated to various MSs. An SR_ID identifies a service instance that is a logical connection typically associated with a channel over the air interface allocated for a MS. Then at step 306, an IP multicast flow session is established and IP multicast data flows from CS2 115 over the new service instance through IP 120, PDSN1 125, RP network 135 (not shown), and BS/PCF1 145 to MS1 140.

To provide full functionality according to the present invention, the MCFTP protocol may include: (1) the possibility to specify filter patterns using IP multicast addresses, (2) the ability to handle the new "Broadcast" flow treatment, (3) the ability to have several MSs, if specified, receiving the same flow treatment for that specified IP multicast flow (i.e. a Broadcast), and (4) the PDSN may indicate the MCS_Ref to the MS to establish an IP multicast flow back to the MS. Various scenarios in which the MCFTP includes these feature functions are provided below.

Figure 4:
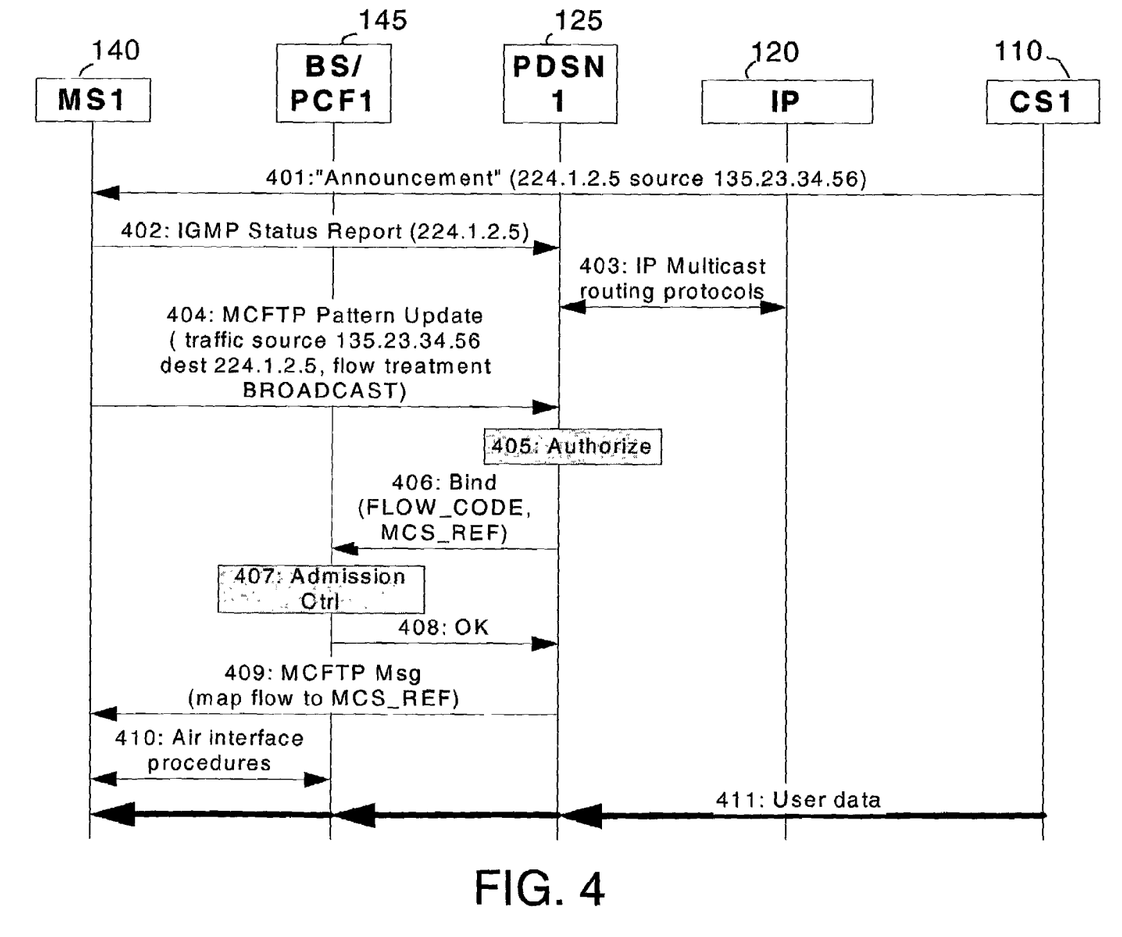
FIG. 4 depicts an exemplary signal flow for an embodiment in which a MS establishes a multicast communication session with a particular content server using a broadcast channel without having been a previous subscriber of the multicast.

Referring now to FIG. 4, an exemplary signal flow is provided for one embodiment in which MS1 140 establishes a multicast communication session with CS1 110 using a broadcast channel, without having previously been a subscriber to the requested multicast communication session. First, at step 401, MS1 140 finds out that an IP multicast flow is sent from CS1 110 (135.23.34.56) to the IP multicast group (address 224.1.2.5), via an announcement message, Announcement (224.1.2.5 source 135.23.34.56). In a variation, MS1 140 could find out about the IP multicast through some other protocol such as SIP, http, etc. Next, at step 402, MS1 140 sends an IGMP message including the multicast address, IGMP Status Report (224.1.2.5), to PDSN1 125 to request joining the multicast group. Then, at step 403, if not already receiving the requested IP multicast flow, the PDSN1 125 may interact with other routers to become a part of the multicast tree for the requested IP multicast flow. Next, at step 404, MS1 140 may send a MCFTP pattern update request, MCFTP Pattern Update (traffic source 135.23.34.45 dest 224.1.2.5, flow treatment BROADCAST), indicating that it wishes to receive the IP multicast flow over a broadcast service channel if it is possible for the RAN system to provide a radio broadcast service for the IP multicast. If it is possible, then at step 405, the request for the broadcasted IP multicast session is authorized by PDSN1 125. Otherwise the IP multicast session may be provided to MS1 140 over an ordinary channel (e.g., see signaling in FIG. 3). In this case it is authorized, so at step 406 PDSN1 125 generates or creates a globally unique Flow_Code from the filter specification received in the MCFTP update. For example, the Flow_Code may include the source address, destination address, destination port, etc. from the filter which is then encoded with an algorithm to produce a unique multicast flow specific bit string. This string may be sent by the PDSN and matched in the BS/PCF to a mapped bit string. This Flow_Code may be created using a standardized algorithm and may be the same regardless of which PDSN that generated it. PDSN1 125 may also generate a new MCS_Ref. Then PDSN1 125 may send a request to BS/PCF1 145 for a binding to be created between the Flow_Code and the MCS_Ref, Bind (Flow_Code, MCS_Ref). Then, at step 407, if BS/PCF1 145 can not find the Flow_Code in its tables and determines that no radio broadcast channel has been established for this IP multicast flow, BS/PCF1 145 may perform some admission control to determine if there is sufficient capacity for this request to be granted. If so, then at step 408 BS/PCF1 145 may store the binding for the Flow_Code, MCS_Ref for future use and gives a positive OK response back to PDSN1 125. Next, at step 409, PDSN1 125 may use an MCFTP message in response to the Pattern Update Request, MCFTP (map flow to MCS_Ref), indicating the MCS_Ref to be used by MS1 140 for the IP multicast flow. In one variation, this message may be a Pattern Update Request message. In either case, MS1 140 may start "listening" for a MCS_Ref to Radio_Params mapping using the MCS_Ref provided by PDSN1. Then, at step 410, the BS/PCF1 145 and the MS1 140 cooperate to establish the air interface. For example, the BS/PCF1 145 takes action to establish the broadcast "channel". This may be triggered by, for example, establishing the binding of Flow_Code and MCS_Ref discussed above or by an arriving IP multicast session data flow shown in step 411. The BS/PCF1 145 would establish a Radio_Params identifier and map it to the MCS_Ref. The procedure may include establishing QoS parameters for the channel. BS/PCF1 145 may, for example, now start to transmit/broadcast the MCS_Ref→Radio_Params binding over the air interface. Then, the MS1 140 would detect the MCS_Ref to Radio_Params mapping and tune its receiver to the defined channel to start receiving the incoming IP multicast data. Or, the MS1 140 may request the MCS_Ref→Radio_Params binding information from the network. As such, in step 411, user data (i.e., the IP multicast communication session data) can now flow from CS1 110 to MS1 140 over the newly established broadcast channel.

Figure 5:
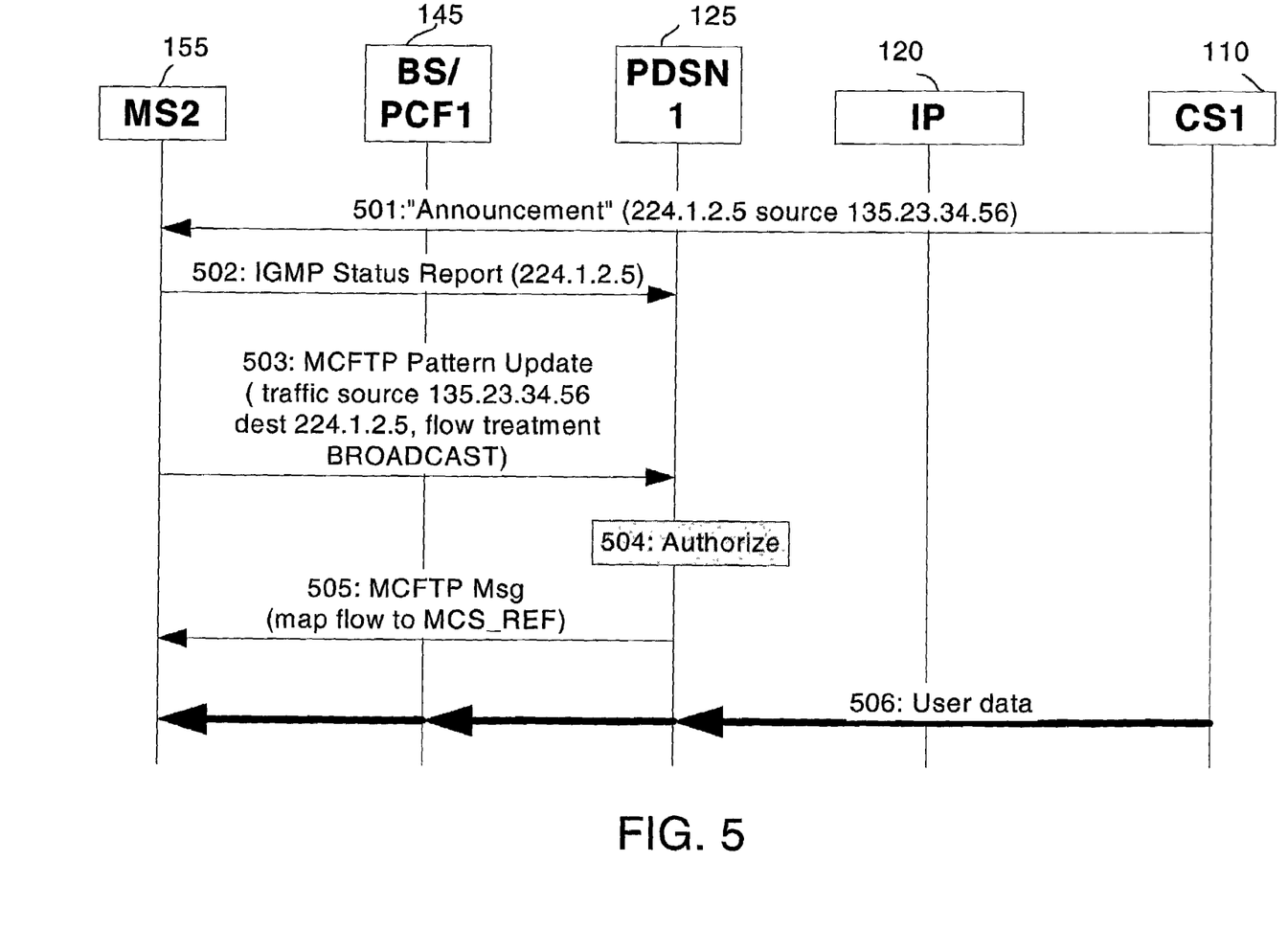
FIG. 5 depicts an exemplary signal flow for an embodiment in which a MS establishes a multicast communication session with a particular content server using a broadcast channel having been a previous subscriber of the multicast via a particular PDSN.

Referring now to FIG. 5, an exemplary signal flow is provided for an embodiment in which MS2 155 establishes an IP multicast communication session with a CS1 110 through PDSN1 125 using a broadcast channel, after MS1 140 had already been a subscriber of the multicast through PDSN1 125 and BS/PCF1 145 via a broadcast channel. In this case, the signal flow is simplified because the multicast had already been routed through PDSN1 125 and BS/PCF1 145, and a broadcast channel was already established for the multicast via BS/PCF1 145 and MS1 140. First, at step 501, M52 155 finds out that an IP multicast flow is sent from CS1 110 at address 135.23.34.56 to the IP multicast group at address 224.1.2.5, e.g. through an announcement message, Announcement (224.1.2.5 source 135.23.34.56). In a variation, some other protocol such as SIP, http, etc. could be used. In any case, the MS2 155 user, being aware of the IP multicast, decides to subscribe to the IP multicast. Thus, at step 502, MS2 155 sends an IGMP message, IGMP Status Report (224.1.2.5), to PDSN1 125, requesting to join the multicast group. PDSN1 125 is already a part of that IP multicast tree so that the IP multicast routing protocols and Flow_Code, MCS_Ref generation and binding are already completed. Next, MS2 155 sends a MCFTP pattern update request, MCFTP Pattern Update (traffic source 135.23.34.56, dest 224.1.2.5, flow treatment Broadcast), to PDSN1 125 indicating that it is to receive the IP multicast flow over a radio broadcast channel, if radio broadcast service is possible. Then, at step 504 PDSN1 125 authorizes the broadcast service request. However, PDSN1 125 determines that there is already a binding for this IP multicast flow and finds the corresponding MCS_Ref, for example, by matching the filter specification of the request to the list of already known IP multicast flows. In one variation, PDSN1 125 may send an indication to the BS/PCF 145 that a new subscriber MS2 155 was added. Next, at step 505, PDSN1 125 may send a MCFTP message, MCFTP (map flow to MCS_Ref), to MS2 155 in response to the Pattern Update Request, indicating the MCS_Ref to be used for setting up and managing the IP multicast flow. In one variation, a Pattern Update Request message could be sent from PDSN1 125 to MS2 155 to indicate the MCS_Ref to be used for the IP multicast flow. MS1 155 may now use the MCS_Ref to determine the MCS_Ref, Radio_Params mapping to use to couple to the IP multicast communication. Then, at step 506, user data for listening to the IP multicast session may flow from CS1 110 to MS2 155 using the newly established broadcast channel. If in this scenario MS2 155 were to have connected to a different BS/PCF then MS1 140, e.g., BS/PCF2 150 using the same PDSN1 125, then the signaling would be similar to that found in FIG. 4.

Figure 6:
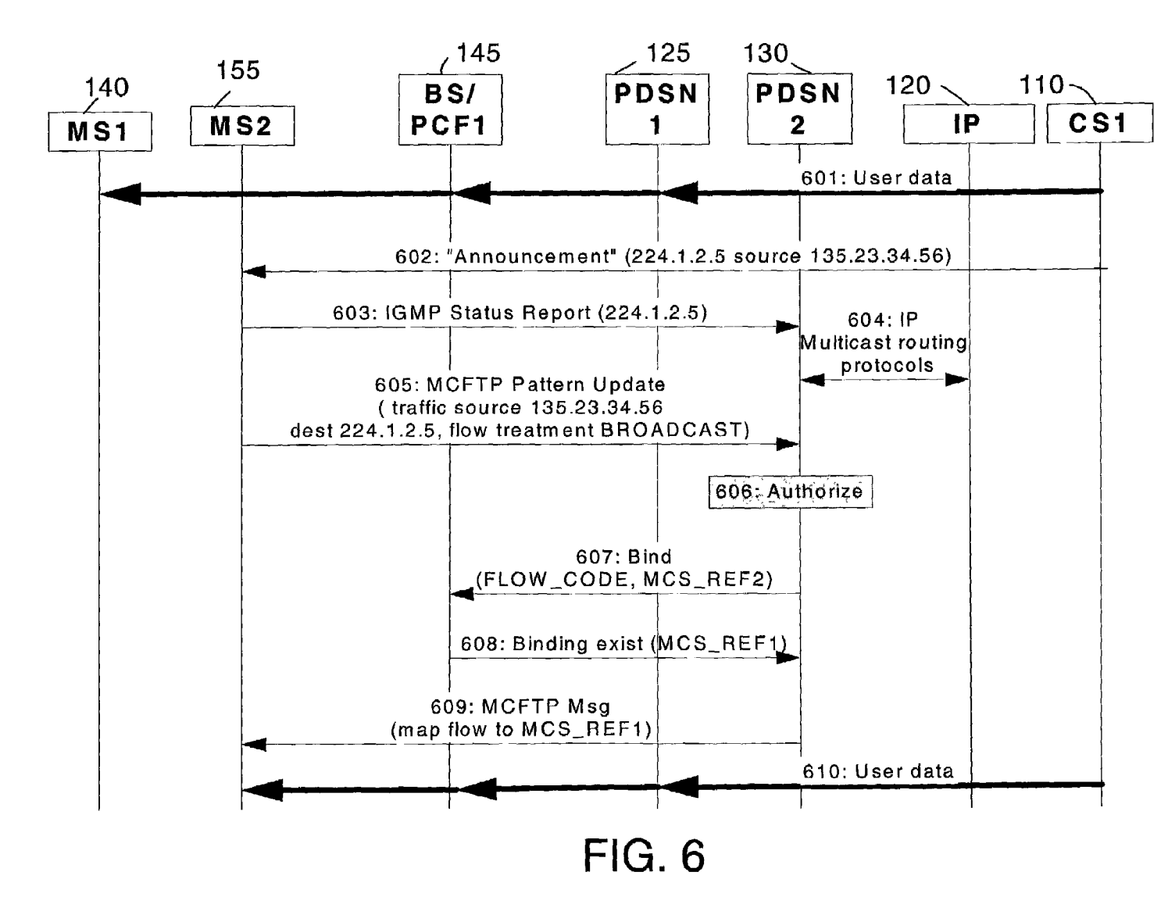
FIG. 6 depicts an exemplary signal flow for an embodiment in which a MS continues a multicast communication session with a particular content server via one PDSN, e.g., PDSN2, using a broadcast channel, having been a previous subscriber to the multicast via another PDSN, e.g., PDSN1.

Referring now to FIG. 6, an exemplary signal flow for an embodiment in which MS2 155 couples to PDSN2 130 and requests to connect with an IP multicast from CS1 110 on a radio broadcast channel, and MS1 140 has been listening to the same IP multicast flow over PDSN1 125 using the same BS/PCF1 145. First, at step 601, the IP multicast flow (user data) from CS1 110 is broadcasted to MS1 140. The multicast flow is mapped to MCS_Ref1. MS1 140 is coupled to PDSN1 125. Then, at step 602, MS2 155, which is registered with PDSN2 130, finds out via an announcement message, Announcement (224.1.2.5 source 135.23.34.56), that an IP Multicast flow is sent from CS1 110 (address 135.23.34.56) to the IP multicast group (address 224.1.2.5). In a variation, MS2 155 could find out about the IP multicast from CS1 110 through some other protocol, such as SIP, http, etc. Next, at step 603, MS2 155 may send an IGMP message, IGMP Status Report (224.1.2.5) to join the IP multicast from CS1 110 via PDSN2 130. Then, at step 604, PDSN2 130 may interact with other routers to become a part of the IP multicast tree for the requested multicast. Next, at step 605, MS2 155 may send a MCFTP message request, MCFTP Pattern Update (traffic source 135.23.34.56 dest 224.1.2.5, flow treatment BROADCAST), to PDSN2 130 indicating that MS2 155 is to receive the IP multicast flow requested over a broadcast channel if broadcast service is possible. Then, at step 606, PDSN2 130 may authorize the request from MS2 155. PDSN2 130 may then create a globally unique Flow_Code from the filter specification received in the MCFTP pattern update. For example, the Flow_Code may include the source address, destination address, destination port, etc. from the filter which is then encoded with an algorithm to produce a unique multicast flow specific bit string. This string may be sent by the PDSN and matched in the BS/PCF to a mapped bit string. This Flow_Code may be created using, for example, a standardized algorithm and may be the same regardless of which PDSN generates it. PDSN2 130 may also generate a new MCS_Ref (MCS_Ref2). Then, at step 607, PDSN2 130 may send a request to BS/PCF1 145 for a binding, Bind (Flow_Code, MCS_Ref2), to be created between the Flow_Code and MCS_Ref2. However, BS/PCF1 145 looks at its stored list of bindings and finds an already existing mapping for that Flow_Code that was created by PDSN1 125 for the IP multicast flow to MS1 140. Thus, in step 608 BS/PCF1 145 responds back to the PDSN2 130 that a binding for that IP multicast already exists, Binding exists (MCS_Ref1). Next, at step 609, PDSN2 130 revises its binding for the IP multicast flow to MCS_Ref1 and sends a MCFTP message, MCFTP (map flow to MCS_Ref1), (which may be in response to the Pattern Update Request message at step 605) indicating the MCS_Ref to be used for the IP multicast flow requested is to be MCS_Ref1. In a variation, the message at step 609 may be, for example, a Pattern Update Request. MS2 155 may now detect the MCS_Ref1, Radio_Params mapping that may be regularly sent out or broadcasted by BS/PCF1. MS2 155 may then tune into the requested IP multicast session using, for example, the same Radio_

Params used by MS1 140 and start listening for user data. Finally, at step 610, user data can flow from CS1 110 to MS2 155 over the same broadcast channel as is being used by MS1 140. Of course, MS1 140 may chose at some point to stop being a member of the IP multicast from CS1 without altering the signaling. Thus, as illustrated by the approach in FIG. 6, if two (or more) MSs are connected to two different PDSNs, but to the same BS/PCF, and they both want to receive the same IP Multicast flow using the radio broadcast flow, the system is configured for efficiency to ensure that only one multicast stream is sent over the air.

Figure 7:
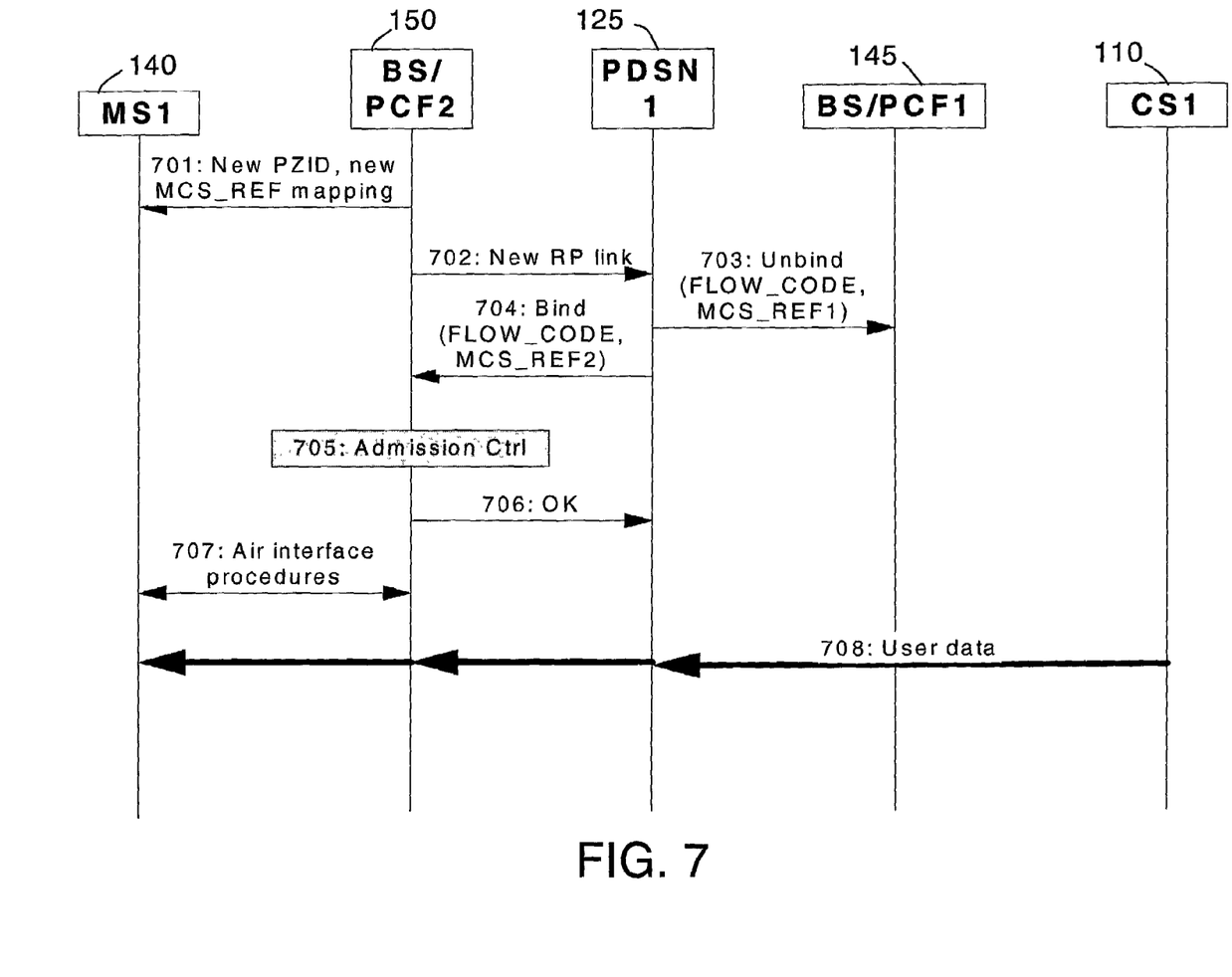
FIG. 7 depicts an exemplary signal flow for an embodiment in which a MS active in a multicast communication session with a particular content server moves from one BS to another BS and continues the multicast through the same PDSN.

Referring now to FIG. 7, an exemplary signal flow is illustrated for an embodiment in which MS1 140, active in a multicast communication session with CS1 110, moves from BS/PCF1 145 to BS/PCF2 150 and may continue the IP multicast session through the same PDSN, PDSN1 125. If MS1 140 moves into an area served by BS/PCF2 150, it will detect entering a new area through receipt of, for example, a new PZID, system identification (SID) or network identification (NID) that is broadcasted. As indicated at step 701, MS1 receives a new PZID. This may trigger MS1 140 to listen for a new MCS_Ref→Radio_Params mapping for the IP multicast flow it has been receiving via BS/PCF1 145. If MS1 140 finds a new MCS_Ref→Radio_Params mapping, it will start listening to this new "channel" instead. If not, MS1 140 may continue to listen for such a mapping, while the network will adjust to the move of MS1 140 from BS/PCF1 145 to BS/PCF2 150. Thus, in step 702, BS/PCF2 150 may send, for example, a standard New RP link message to PDSN1 125, and the change of BS/PCFs triggers a "hand-off" of the RP network 135 link from the old BS/PCF1 145 to the new BS/PCF2 150.

Next, at step 703, since MS1 140 is no longer connected to BS/PCF1 145, PDSN1 125 sends an unbind message, Unbind (Flow_Code, MCS_Ref1) to BS/PCF1 145. In response, BS/PCF1 145 may remove MS1 140 from the list of "listeners" or this specific Flow_Code, and may if there are no other mobile stations listening to the flow de-allocate the radio resources associated with the multicast flow, terminating the transmission. Then, at step 704, PDSN1 125 determines that the BS/PCF association of MS1 140 has changed to BS/PCF2 150 and sends a binding request message, Bind (Flow_Code, MCS_Ref2), to BS/PCF2 150 for a binding to be created between the Flow_Code and MCS_Ref2. Next, at step 705, BS/PCF2 150 will not find the Flow_Code in its binding tables and determines that no "broadcast channel" has been established for this flow. BS/PCF2 150 may then perform some admission control to determine if resources exist so that the request from MS1 140 could be granted. BS/PCF2 150 may then store the binding Flow_Code, MCS_Ref2 for future use. Then if the resources are available BS/PCF2 150, at step 706, may send a positive response back to PDSN1 125 indicating that the IP multicast session may be broadcast to MS1 140. Next, at step 707, BS/PCF2 may take action to establish the broadcast "channel", establishing air interface procedures with MS1 140. This may be triggered by, for example, the binding indicated above in step 704, or by an arriving IP multicast session data flow (see step 708). The procedure may include, for example, establishing QoS parameters for the new broadcast channel. BS/PCF2 150 may, for example, also now start to transmit/broadcast the MCS_Ref2→Radio_Params binding over the air interface. Of course, the MS1 140 may request receipt of the MCS_Ref2→Radio_Params binding from the network. The MS1 140 may detect the MCS_Ref2→Radio_Params mapping from the BS/PCF2 150 to tune into the specified Radio_Params to start receiving user data. Then, at step 708, user data for the IP multicast session may flow from CS1 110 over a newly established broadcast channel from BS/PCF2 150.

However, if a MS moves from one BS/PCF to another BS/PCF (e.g., the packet zone identifier (PZID) changes), but the same PDSN is used, the communication system may enable the MS to continue to listen to the same IP multicast flow without having to signal to the PDSN, and thus not awakening dormant service instances. The MS may notify the new BS/PCF via a control channel that it is present in the BS/PCF cell and the network and mobile may use the existing MCS_Ref. Although, as indicated in the previous embodiment illustrated in FIGS. 4–6, signaling to the PDSN may likely be used if the point of attachment, i.e., the PDSN, changes during this procedure.

FIGS. 3–7 present a few possible IP multicast connection and management scenarios. Various other scenarios are also possible and would operate similarly. For example, a MS may be moving and need to be served by a new BS/PCF while also requesting or requiring use of a different PDSN. This scenario would essentially be the same or similar as the one where the MS first decides to listen to an IP multicast flow. As soon the MS realizes that it has moved to a new PDSN (e.g. when Point to Point Protocol (PPP) is renegotiated) it may stop listening for the multicast flow on any broadcast channels and initialize the setup of multicast session anew.

The multicast capable communication system may also include other supporting functions such as user authorization, establishing a QoS, pre-configuration, accounting, security and header compression, to complement the multicast service. If a desired IP multicast is, for example, a pay-for-use service or limited access service, a method for user authorization may be included. One exemplary method for providing user authorization may be via an authentication, authorization, and accounting (AAA) server. Each user application should include a QoS to ensure that the information flow meets the expected quality level of the user, e.g., speed of receiving information. In the case of IP multicast, one method of establishing and providing desired QoS characteristics may be added as a parameter to the MCFTP Pattern update. Another approach may be that an air interface message (similar to origination) is sent using the MCS_Ref as a reference. These procedures may result in the network receiving QoS requests for the IP multicast flow from each MS that wishes to receive the flow. For example, the network may use the QoS parameters of the first request it receives.

Rather than establish IP multicast flows upon request from an MS, the system may be configured to establish the IP multicast flow channels before a MS requests to join the multicast so as to give the IP multicast a more close resemblance to the always on characteristics of a TV broadcast. For example, the PDSNs could be preconfigured with flow pattern to MCS_Refs bindings. If the transmission is to be "always on", i.e., always transmitting even if no one is "listening", the BS/PCF may be preconfigured with MCS_Ref to Radio_Params bindings.

The communication system should also include an accounting feature/function. For example, an IP multicast session start time, stop time, requested QoS, etc. may go through PDSN to an authentication, administration, and accounting (AAA) center or location, like any other accounting data in legacy telecommunication systems.

The communication system may also provide for security of an IP multicast session to accommodate feature/functions such as private sessions. For example, an IP multicast service could be provided with end-to-end encryption. The mechanisms described in this document could possibly be complemented with some kind of key distribution, so that MCFTP is also used to distribute keys to those subscribers that have been authorized. This may also be done on the air interface level for signaling at that layer.

The communication system may also be configured with existing modified header compression algorithms to improve the overall packet payload efficiency.

Although particular embodiments of the present invention have been shown and described, it will be understood that it is not intended to limit the invention to the preferred embodiments described herein and it will be obvious to those skilled in the art that various changes and modifications may be made without departing from the spirit and scope of the present invention. Thus, the invention is intended to cover alternatives, modifications, and equivalents, which may be included within the spirit and scope of the invention as defined by the claims. For example, the present invention provides a number of embodiments with exemplary signaling methods for establishing and maintaining an IP multicast flow including a sequence of steps. However, the present invention is not intended to be limited to these particular sequence of steps. One skilled in the art will recognize that these sequences of steps may be performed in various other orders and still be comprehended by the present invention. All publications, patents, and patent applications cited herein are hereby incorporated by reference in their entirety for all purposes.

What is claimed is:

1. A method for managing a multicast session in a communication system, comprising the steps of:
    generating a first multicast flow identifier that is used to select one of many available multicast session information flows;
    generating a second multicast flow identifier, smaller than the first multicast flow identifier, that is used to select one of many available multicast session information flows;
    establishing an inter-relationship between the first multicast flow identifier and the second multicast flow identifier;
    generating a set of radio parameters to establish a communication channel to support a selected multicast session information flow;
    mapping the second multicast flow identifier to the set of radio parameters;
    sending the mapping of the second multicast flow identifier to the set of radio parameters to a mobile station (MS) requesting receipt of the selected multicast session information flow; and
    sending the second multicast flow identifier to the MS.

2. The method of claim 1, wherein the first multicast flow identifier is globally unique and the second multicast flow identifier is locally unique.

3. The method of claim 1, wherein a router generates the first multicast flow identifier and the second multicast flow identifier, and establishes their inter-relationship, and the BS generates the set of radio parameters.

4. The method of claim 1, further comprising the step of:
    storing the inter-relationship between the first multicast flow identifier and the second multicast flow identifier in the BS.

5. The method of claim 1, wherein the first multicast flow identifier determines that only a single transmission of the selected multicast session information flow is sent over a radio broadcast channel even though multiple routers have respective MSs requesting the same selected multicast session information flow.

6. The method of claim 5, wherein the second multicast flow identifier determines that the MS continues to receive the selected multicast session information flow after transitioning from a connection with a first BS to a connection with a second BS where the selected multicast session information flow is routed through the same router.

7. The method of claim 6, wherein the routers are packet data serving nodes (PDSNs) and the multicast session is provided using internet protocol (IP).

8. The method of claim 1, further comprising the step of:
    sending multicast filter information from the MS to the router using a multi-channel flow treatment protocol (MCFTP) message, wherein multicast filter information is used to generate the first multicast flow identifier.

9. A communication system for managing a multicast session, comprising:
    a router configured to generate a first multicast flow identifier that is used to select one of many available multicast session information flows and to generate a second multicast flow identifier, smaller than the first multicast flow identifier, that is used to select one of many available multicast session information flows, wherein the router is further configured to establish an inter-relationship between the first multicast flow identifier and the second multicast flow identifier;
    a base station (BS) configured to generate a set of radio parameters to establish a communication channel to support a select multicast session information flow and to map the second multicast flow identifier to the set of radio parameters; and
    wherein the BS is configured to send the mapping of the second multicast flow identifier to the set of radio parameters to a mobile station (MS), and the router is configured to send the second multicast flow identifier to the MS in a multi-channel flow treatment protocol (MCFTP) statement.

10. The system of claim 9, wherein the first multicast flow identifier is globally unique and the second multicast flow identifier is locally unique.

11. The system of claim 9 wherein the system is configured to store the inter-relationship between the first multicast flow identifier and the second multicast flow identifier in the BS.

12. The system of claim 9, wherein the first multicast flow identifier determines that only a single transmission of the multicast flow is sent over a radio broadcast channel even though multiple routers have respective MSs requesting the same selected multicast session information flow.

13. The system of claim 12, wherein the second multicast flow identifier determines that the MS continues to receive the selected multicast session information flow after transitioning from a connection with a first BS to a connection with a second BS where the selected multicast session information flow is routed through the same router.

14. The system of claim 13, wherein the routers are packet data serving nodes (PDSNs) and the multicast session is provided using internet protocol (IP).

15. An internet protocol (IP) multicast service, comprising:
    a router configured to generate a first multicast flow identifier that is used to select one of many available multicast session information flows and generate a second multicast flow identifier, smaller than the first multicast flow identifier, that is used to select one of many available multicast session information flows;

a base station (BS) coupled to the router, the BS stores an inter-relationship between the first multicast flow identifier and the second multicast flow identifier and generates a set of radio parameters to establish a communication channel to support a selected multicast session information flow and maps the second multicast flow identifier to the set of radio parameters; and a mobile station (MS) coupled to the base station that selects one of the many available multicast session information flows, receives the second multicast flow identifier from the router, receives the radio parameters from the BS, and tunes into the selected multicast session information flow using the radio parameters.

16. The service of claim 15, wherein the router establishes an inter-relationship between the first multicast flow identifier and the second multicast flow identifier.

17. The service of claim 16, wherein the first multicast flow identifier is globally unique and the second multicast flow identifier is locally unique.

18. The service of claim 17, wherein the BS sends the mapping of the second multicast flow identifier to the set of radio parameters to the MS, and the router sends the second multicast flow identifier to the MS in a multi-channel flow treatment protocol (MCFTP) statement.

19. The service of claim 18, wherein the first multicast flow identifier determines that only a single transmission of the selected multicast session information flow is sent over a radio broadcast channel even though multiple routers have respective MSs requesting the same selected multicast session information flow.

20. The service of claim 19, wherein the second multicast flow identifier determines that the MS continues to receive the selected multicast session information flow after transitioning from a connection with a first BS to a connection with a second BS where the selected multicast session information flow is routed through the same router.

21. The service of claim 20, wherein the routers are packet data serving nodes (PDSNs).

22. The service of claim 15, wherein the IP multicast service is provided by the BS over a radio broadcast channel in response to a request from the MS.

23. The service of claim 15, wherein the IP multicast service is provided by a BS over a dedicated radio channel in response to a request from the MS.

24. The service of claim 15, wherein the IP multicast service is provided by the BS over a radio broadcast channel even though the MS requests a dedicated radio channel.

25. The service of claim 15, wherein the IP multicast service is provided by the BS over a dedicated radio channel even though the MS requests a broadcast radio channel.

26. A communication system for managing a multicast session, comprising:

a router configured to generate a first multicast flow identifier that is globally unique and used to select one of many available multicast session information flows; and a base station (BS) that generates a set of radio parameters to establish a communication channel and maps the first multicast flow identifier to the set of radio parameters, wherein the BS sends the mapping of the first multicast flow identifier to the set of radio parameters to a mobile station (MS), and the router sends the first multicast flow identifier to the MS in a multi-channel flow treatment protocol (MCFTP) statement wherein the router generates a locally unique second multicast flow identifier, smaller than the first multicast flow identifier, that is used to select one of many available multicast session information flows and establishes an inter-relationship between the first multicast flow identifier and the second multicast flow identifier.

27. The system of claim 26, wherein router receives multicast filter information in a MCFTP message sent from the MS, and the multicast filter information is used to generate the first multicast flow identifier.

28. The system of claim 26, wherein the system is configured to store the inter-relationship between the first multicast flow identifier and the second multicast flow identifier in the BS.

29. The system of claim 26, wherein the router sends the second multicast flow identifier to the MS in a multi-channel flow treatment protocol (MCFTP) statement.

* * * * *